Oct. 10, 1961 H. A. WHITE 3,004,247
ROTARY ELECTROMECHANICAL DATA TRANSLATOR
Filed May 3, 1960 2 Sheets-Sheet 1
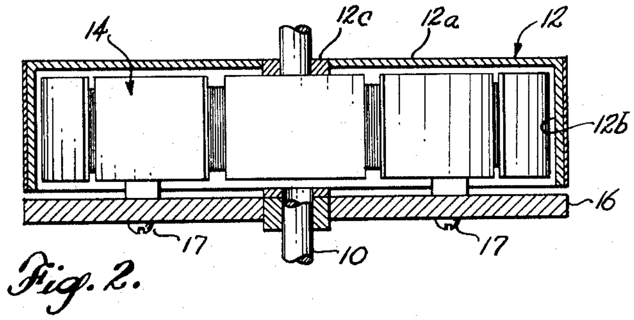
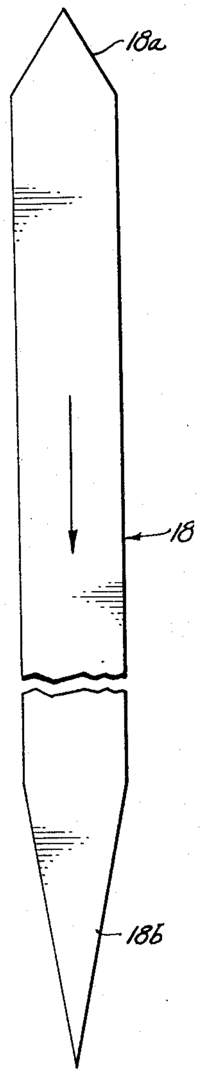
Fig. 3.
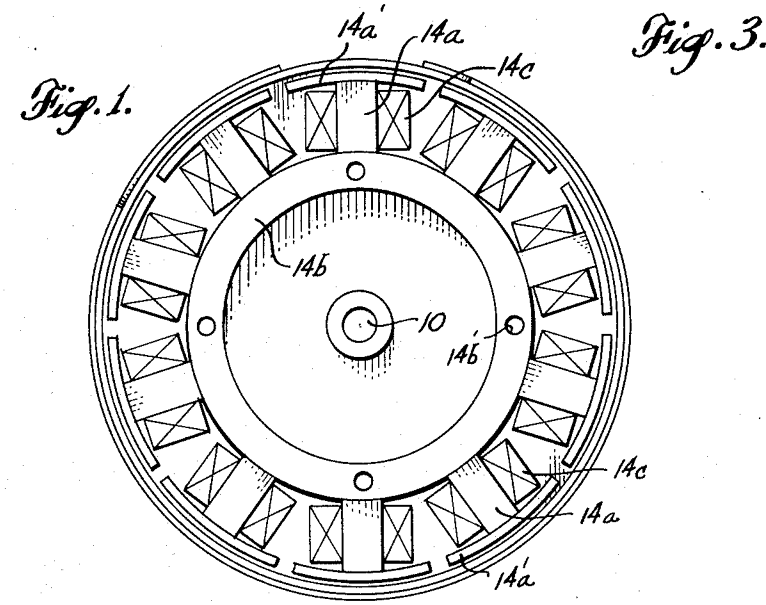
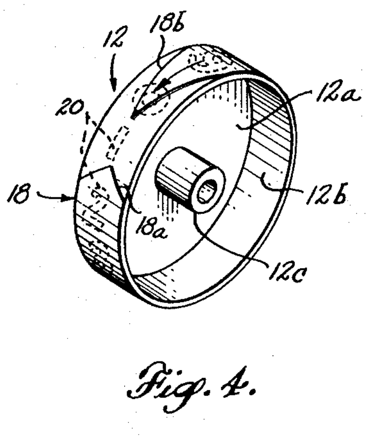
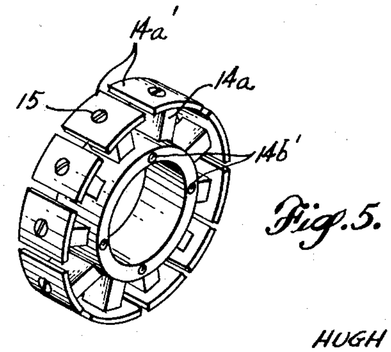
INVENTOR.
HUGH A. WHITE
BY
Reynolds, Beach & Christensen
ATTORNEYS Oct. 10, 1961 H. A. WHITE 3,004,247

ROTARY ELECTROMECHANICAL DATA TRANSLATOR

Filed May 3, 1960 2 Sheets-Sheet 2

INVENTOR.
HUGH A. WHITE

BY
Reynolds, Beach & Christensen
ATTORNEYS

United States Patent Office 3,004,247

Patented Oct. 10, 1961

3,004,247
ROTARY ELECTROMECHANICAL DATA TRANSLATOR

Hugh A. White, 3981 Chilton Lane, San Bruno, Calif.

Filed May 3, 1960, Ser. No. 26,506
12 Claims. (Cl. 340—174.1)

This invention relates to improvements in apparatus for translating electrical signals into selected shaft position, as in the recording or indicating of numerical values or other data, and is herein illustratively described by reference to the presently preferred embodiments; however, it will be recognized that certain modifications and changes therein with respect to details may be made without departing from the underlying essentials involved.

In the case of direct-reading multi-digit decimal number indication, it is old in the art to mount a plurality of digit-place drums in series relationship on a common shaft. The drums were each free to turn on the shaft. The shaft was continuously rotated. When unrestrained, the drums rotated with the shaft substantially at shaft speed because of friction, so that decimal digits marked on the drum perimeters moved past a viewing window too fast to be read, and appeared as a continuous blur. Within each drum was a circular series of ten electromagnets on a stationary support, and on each drum interior surface, occupying a small fraction of its peripheral extent, a ferromagnetic armature. When any electromagnet was energized, corresponding to a digit to be selected on the associated drum, the armature was arrested by magnetic attraction to the magnet pole, and the drum was thereby stopped with the digit appearing in the viewing window. With all of the drums stopped at selected positions, the desired multi-digit number appeared. Since the shaft continued to rotate, deenergization of the electromagnets selected for a particular reading freed the drums, which immediately returned to the rotational state, and thereby eradicated the former reading.

An object of this invention is broadly to expand the fields of application for such devices, and by improvements and additions therein to render the same more efficient and useful.

A further object is to provide improved devices of this general type which can be used for such diverse purposes as numerical and other data indication, for data storage and recall, for computer control and output display, for synchronously programmed multi-channel recording, recall and display, and for a variety of related applications some of which heretofore have required elaborate electronic or relay systems much more complex than those made possible herein.

A specific object is a device of the described character having improvements by which drum rotation is stopped more quickly, and the drum held stationary with as great or greater positional accuracy than heretofore. A related object is to control drum position without use of moving or rubbing parts, or of parts which by wear or other changes can impair calibrational accuracy of the device. Reducing the force and the related electrical energy required for quickly stopping and holding the drums, and also reducing the time required for the drums to resume rotation when released constitute additional objects. Moreover, it is a purpose to provide, in a combined apparatus, means permitting storage and recall of data by the drums, with or without reference to a drum display function or to the code or number system employed for display, and without impairing the other advanced characteristics of the improved drum units.

Another specific object is to provide in a multi-function drum system a simple and effective means automatically synchronizing and co-phasing the drums during rotation, which drums in such a system may carry or comprise a data storage medium, such as a coating of a magnetic oxide material, so that multi-channel or multi-place data recording and read-out are made possible using the same drum units, if desired, as those adapted to display numbers or other data.

An important feature of the improved drum units resides in the mounting of a relatively thin, peripherally elongated and specially configured ferromagnetic armature strip on the side of an electrically conductive nonmagnetic outer drum wall which is opposite the side thereof along which the electromagnets are successively stationed. Other features are present in the preferred drum construction wherein the armature strip ends are tapered to points and the drum is formed with a relatively thin wall and preferably of a light weight nonmagnetic highly conductive material.

Still other features reside in drum-mounted and cooperative shaft-mounted yieldable detent elements, cooriented on the drums and on the shaft, respectively, by which co-phased synchronous drum rotation is assured without impairing the independent drum stopping characteristics. Preferably these elements individually comprise a bar magnet on the shaft and an associated ferromagnetic armature strip of elongated proportions mounted on a nonmagnetic drum flange situated within a circular array of electromagnets which are in turn surrounded by the outer drum wall. Preferably the form and subtention angle of the two armature strips on the same drum are substantially equal. Peripherally extending magnetic oxide coatings on the drums permit recording of data by magnetization during drum rotation by adjacent recording heads, the records resulting on the different drums being co-indexed because of drum co-phasing during rotation. Additionally visible digit sequences are or may be marked on the drum peripheries for visible read-out display purposes.

These and other features, objects and advantages of the invention will become more fully evident from the following description by reference to the accompanying drawings.

FIGURE 1 is an end view of one of the drum units in a first embodiment, viewing the shaft in section along its axis.

FIGURE 2 is a sectional side view of one of the drum units.

FIGURE 3 is a developed view of a ferromagnetic armature strip mounted on the drum exterior periphery.

FIGURE 4 is an isometric view of the rotary drum element of a drum unit.

FIGURE 5 is an isometric view of the stationary field coil core and mounting structure of a drum unit.

Figures 6, 7, 8, 9:
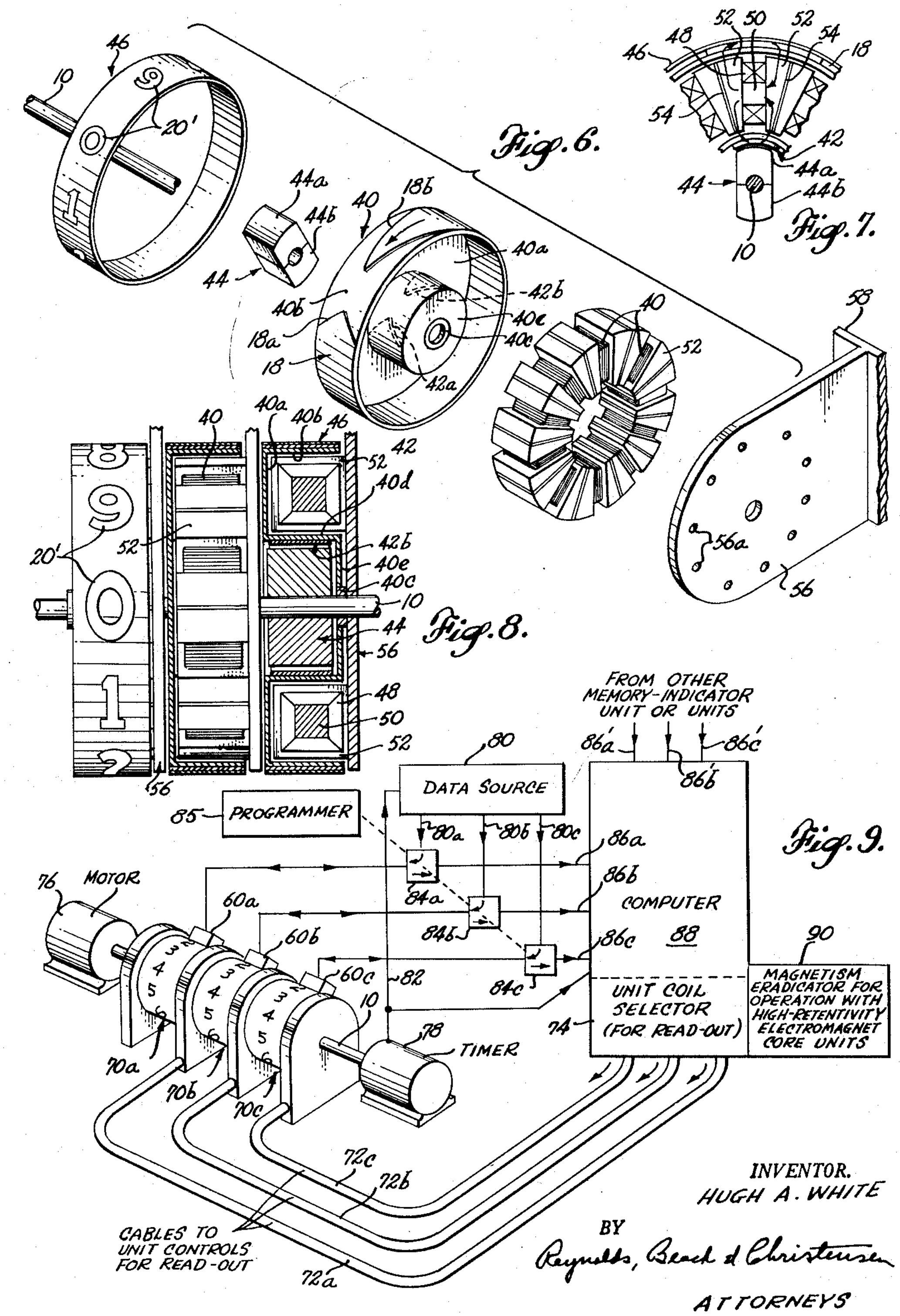
FIGURE 6 is an exploded isometric view of the parts of a second drum unit embodiment.
FIGURE 7 is a fragmentary end view of one of the drum units, illustrating the magnetic flux linkage.
FIGURE 8 is a side view of a three-drum combination employing drum units of the second embodiment.
FIGURE 9 is a simplified block diagram illustrating an application of the invention wherein the drum units serve in a data storage and recall capacity as well as in the capacity of numerical display indicators.

FIGURES 1 to 5 illustrate one of the drum units which is operatively associated with the constantly rotated shaft 10. This drum unit comprises a cup-like member 12 including the flat circular disk-like web **12*a*, the cylindrical peripheral flange 12*b* mounted transversely on the outer edge of the disk, and the hub or journal 12*c* by which the cup-like member 12 is mounted for relative rotation on the shaft 10. Preferably, the drum member 12, and at least the peripheral flange 12***b* thereof, is formed of a light weight, highly electrically conductive, nonmagnetic material, such as aluminum or aluminum alloy, and so that the entire cup-like member has a relatively small rotational moment of inertia or mass.

Within the interior of the cup-like member 12 is installed a stationary multi-coil field structure 14. In the case of a decimal system drum unit, the field structure 14 has ten salient magnetic poles or coil cores 14*a*, with peripherally disposed pole pieces 14*a'*, mounted at uniformly spaced intervals about the periphery of the annular supporting core 14*b*. The annular core 14*b* and the salient pole cores 14*a* and pole pieces 14*a'* are formed of ferromagnetic material, which in certain applications will have a relatively low retentivity whereas in others it may have a higher retentivity, i.e., when it is desired to provide an indicator or recording unit which holds its response condition following deenergization of the field coil which produced that condition. Individual magnetizing coils 14*c* surround the respective pole cores 14*a*. The core member 14*b* is suitably mounted on a stationary support such as a journal plate 16 for shaft 10, which plate may be carried by an external support (not shown) common to a series of such drum units mounted in successive coaxial alignment on the shaft 10.

Mounted on the exterior periphery of the flange 12*b* is a ferromagnetic armature strip 18 which extends around the greater portion of the circumference of the flange. At one end, 18*a*, this ferromegnetic armature strip 18 is tapered rather bluntly to a point whereas at its opposite end, 18*b*, it is tapered relatively gradually to a point. Preferably the two tapered ends are spaced apart circumferentially by a small fraction of the drum's circumference, but at a sufficient distance such that magnetic flux emanating outwardly from one of the energized coils and passing through one of the tapered end portions of the ferromagnetic armature strip does not fringe materially into the main body of the opposite end of the strip. The reason for this will become evident as the description proceeds. On the other hand, it is desired in this embodiment to employ a ferromagnetic armature strip which occupies as much of the peripheral extent of the flange 12*b* as possible while observing the foregoing condition.

Assuming no external restraint on the drum member 12, i.e., none of the coils 14*c* is energized, the coefficient of friction between the continuously rotated shaft 10 and the hub 12*c* is sufficient that the drum member 12 is constrained to rotate at a speed which is substantially equal to the speed of rotation of the shaft. This speed is quickly assumed because of the relatively low mass of the rotary cup-like member 12. In order to minimize this mass, the ferromagnetic armature strip is made as thin as possible consistent with requirements to be described. The direction of shaft rotation in relation to the mounting of the strip 18 on the drum member 12 is such that the strip rotates in the direction of the arrow as depicted in FIGURES 3 and 4, that is, in the direction in which the gradually tapered end 18*b* points. With the shaft still rotating, as it continues to do both during and between indications of operations of the drum system, energization of one of the ten coils 14*c* produces a concentrated magnetic field which fringes outward into and through the highly conductive flange 12*b* and into the body of the ferromagnetic armature strip 18. Because of this basic field and the electrical conductivity of the flange 12*b*, eddy currents flow in the flange which produce a counter-magnetomotive force, and thereby an opposing field, which reacts with the basic field in order to retard the member 12. During most of the rotational cycle of the member 12, the armature strip 18 overlying the magnetized pole core presents a low-reluctance bridge traversed by magnetic flux passing outward through the drum flange from the pole face of the energized coil, thence back inward through the immediately adjacent pole faces and cores, and finally through adjacent portions of ferromagnetic ring 14*b* to the magnetized pole core to complete the loop. Thus, the presence of the magnetic strip 18 on the side of the flange 12*b* opposite that adjoined by the selectively energized coils 14*c*, "draws" the field outward through the flange and, in effect, intensifies the magnetic field density which is available for producing eddy-current flow in the damping vane or flange, braking the light-weight cup 12 to a reduced speed at which it is readily stopped. During that portion of a total cycle of rotation in which the cross-section of the strip 18 within the emanating field remains uniform, a uniform retarding force is applied to the member 12 as a result of the magnetic interaction. However, as the bluntly tapered end 18*a* comes into proximity with the field and attempts to move past that field, or past the pole face through which it emanates, there is a strong magnetic attraction tending to draw it back into the field because of the sudden reduction of magnetic reluctance which would accompany the separation. This force which tends to draw and hold the bluntly tapered end 18*a* in registry with the magnetic field acts in opposition to two forces, namely the momentum force of the cup and also the friction force or torque produced by the constantly rotating shaft 10. If the cup has been sufficiently retarded by eddy-current braking effect, the drum will be stopped by the described magnetic attraction effect with the bluntly tapered end 18*a* in registry with the pole face of the energized coil and will remain in that position. The position assumed by the cup will be that in which the retentive or holding force produced by magnetic attraction is exactly equal and opposite to the force of friction tending to cause rotation of the drum as a result of the shaft's rotation. The position is made a definite one by causing the taper of end 18*a* to occur in a subtended peripheral angle which approximates or is of the order of half the angular spacing from pole center to pole center. It is desired to provide the end 18*b* with a gentle or gradual taper, preferably occupying a subtended angle approximately three times that of the tapered end 18*a*, primarily so that any fringing of magnetic field into the gradually tapered end 18*b* encounters a relatively small cross-section of ferromagnetic strip material and there is a relatively small tendency for the end 18*b* to be attracted into alignment with the energized coil. To the extent there is a degree of attraction from this source, it is added to the rotational torque created by shaft friction, and it lessens the positive stopping characteristic of the drum unit wherein the bluntly tapered end 18*a* is arrested and held in positive alignment with the energized coil. Moreover, the gradualness of the taper of the end 18*b* avoids the sudden impulse of torque which would occur with a bluntly tapered end when such end approached registry with the coil under energization. Such an impulse of torque could delay or impair rapid stopping of the drum by adding momentarily to the drum speed. The form of armature strip preferred as in the example permits the strip to extend around a large fraction of the drum's periphery to improve the dynamic braking of the unit without defeating that objective by adding unduly to its mass.

Mechanical details of construction of the coil assembly and of the drum member 12 may vary. In the illustration, the pole pieces 14*a'* are removably secured to the outer faces of the pole cores 14*a* by means of screws 15. The coils may therefore be pre-wound and appropriately bound for installation by merely inserting them over the pole cores 14*a* and then applying the pole pieces 14*a'* as retainer caps which, by the tightening of the screws 15, are brought snugly to bear against the outer sides of the coils, or against suitable intervening shim material (not shown) interposed between such coils and the inner surfaces of the pole pieces. The ferromagnetic strip 18 may be deposited or applied upon the exterior surface of the drum flange 12*b* in any suitable manner, such as by adhesively bonding it in position, or otherwise. If desired, roller bearings or ball bearings may be used in the hub 12*c*, or the hub may be designed of a suitable bearing material to avoid use of intervening roller elements. The annular core member 14*b* may be provided with mounting screw holes 14*b'* by which to secure the same, by screws 17, to support 16.

It will be evident that number digits, such as those designated 20 and shown by dotted lines in FIGURE 4, or code marks of any suitable form whether for direct viewing or otherwise, may be marked or stationed around the periphery of the drum unit rotor. It will also be evident that the mounting of such a drum unit or a series of similar units behind a slit or window in a housing (not shown) in conventional manner will provide an indicator wherein a selected number will appear in stationary position to be read when one of the coils 14*c* of each unit is energized, each coil being associated with a different digit marked on the drum periphery. Obviously binary, trinary, or any other base may be used for the number system, and also the number of coils required will be equal to the base chosen.

In the modified drum unit shown in FIGURES 6, 7 and 8, the cup-like member 40, corresponding to the member 12 in the preceding embodiment, has an annular peripheral flange 40*b* supported by a disk-like web 40*a*. In this case the inner edge of the web 40*a* is formed of a relatively large radius and carries, or more correctly is carried by a second, inner flange 40*d* which projects axially from the same side of the web 40*a*, as does the flange 40*b*. The opposite edge of the flange 40*d*, in turn, is mounted on the outer, peripheral edge of the disk-like web 40*e*, which is carried by a journal or hub 40*c* mounted rotationally on the constantly rotated shaft 10. The ferromagnetic armature strip 18 is mounted on the outer flange 40*b* as was the similar strip mounted on the flange 12*b* in the preceding embodiment. A similar ferromagnetic armature strip 42 is mounted on the flange 40*d*, preferably the interior side thereof, and has abruptly and gradually tapered ends, respectively, designated 42*a* and 42*b*, which in terms of subtended angle and orientation about the axis of shaft 10, correspond to the ends of strip 18. Both the flange 40*d* and the flange 40*b* are formed of relatively highly conductive material. Preferably the entire rotor comprising the flanges and the webs is of relatively light weight thin-wall material such as aluminum or aluminum alloy, giving it relatively low mass thereby to facilitate quick starting and stopping of such rotor.

Within the cup interior defined by the flange 40*d* and the web 40*e* is mounted upon the shaft 10, to rotate continuously with such shaft, a bar magnet assembly 44, which comprises a bar magnet 44*a* and a counter-balancing mass 44*b*. Each drum unit is similarly constructed and each has mounted on the shaft 10 within the drum unit a similar bar magnet assembly 44. The purpose of these bar magnets is to synchronize and co-phase the drums of a multi-drum assembly, such as that shown in FIGURE 8, to be described, during periods when their field coils remain deenergized. By reason of the magnetic attraction of the bar magnets 44*a* for the gradually tapered ends 42*b* of the ferromagnetic armature strips 42, there is a detent action which causes the drums to rotate in precise synchronism with the shaft 10, and co-phased or in predetermined phase relationship with each other, once the drums have been brought up to speed as a result of the combined effects of shaft friction and the magnetic interaction of the bar magnets 44 and the gradually tapered armature strip ends 42*b*.

A magnetic oxide layer 46 may be provided around the periphery of the outer drum flange 40*b* to furnish magnetic recording surface or medium, equivalent to a continuously rotated magnetic tape. By co-phasing the synchronously rotated drum units as a result of the bar magnet action, certain time-related recording and recall functions may be performed employing the different drum units for computing purposes and otherwise.

Also in this modified embodiment, the ferromagnetic field coil structure is somewhat different than in the preceding embodiment. In this case, the individual coils 48 have circumferentially extending axes and are mounted on circumferentially extending cores 50. Pole pieces 52 mounted on opposite ends of each core 50 extend in radial planes transverse to the coil axis and are suitably bonded as by means of a nonferromagnetic adhesive material layer 54 to the similar pole faces of the adjacent pole pieces. A ring assembly of successively interbonded electromagnets is thus formed of a size to be received within the annular space defined between the two flanges 40*b* and 40*d* and the web 40*a*. The electromagnetic field structure assembly in turn is mounted as by bonding it adhesively to the non-magnetic supporting plate 56 carried by a supporting base 58 as shown. Terminal holes 56*a* provided in the plate 56 furnish access for conductors leading to the ends of the respective coil windings. Printed circuit conductors may be deposited on the plate 56 for these connections if desired.

Because of the serial relationship of the high-reluctance gaps formed by the adhesive layers 54 interposed between electromagnets around the ring assembly, the magnetic circuit which is formed when a particular coil is energized (FIGURE 7) includes the coil core 50 and the associated pole pieces 52, but does not include the cores of the other coils to any material extent. Instead, the field which emanates from the radially outer and inner ends of the pole pieces of the energized coil strays outward through the flange 40*b* and into the ferromagnetic armature strip 18 and also strays inwardly into the ferromagnetic armature strip 42. The functions of this magnetic flux in passing outwardly through the flange 40*b* and into the strip 46 is the same as that described in connection with the embodiment of FIGURES 1, et seq. The function of the magnetic flux straying inwardly into the ferromagnetic strip 42 is primarily to partially or completely offset the additional rotative torque which is applied by reason of the interaction between the bar magnet 44*a* and the gradually tapered end 42*b*. Thus, in this embodiment as in the preceding embodiment, the rotor is arrested quickly in the correct stopping position by reason of energization of one of the stator coils and is quickly brought substantially up to shaft speed when the coil is deenergized, assuming the ferromagnetic material used in the field structure is of a low retentivity type. Number digits 20' for read-out purposes may be printed on the magnetic oxide recording layer 46 if desired.

It will be recognized that the relative physical dimensions shown in the illustrated embodiments are somewhat exaggerated for convenience in illustration and for purposes of understanding. In actual practice, the magnetic oxide film 46 may be very thin in relation to the thickness of the drum flanges 40*b* and 40*d*, whereas the ferromagnetic armature strips 18 and 42 may be thinner than, or of the same order of thickness as the drum flanges upon which they are mounted. These are design considerations and will be subject to variation depending upon the materials used and the relative forces involved and required to be met or produced in the system.

In FIGURE 8 three similar drum units are mounted on the common shaft 10. Different portions of the middle unit and of that at the right in the figure are broken away sectionally to show certain features of construction and arrangement. It will be recognized that these drum units may be installed in a suitable housing (not shown) behind a slit or window wherein the number digits of the rotors are viewable in a line parallel to the axis of shaft 10 so that when the coils selected in each of the drum units have been energized, three distinct numbers will appear in stationary position to be viewed, representing the desired number display.

In FIGURE 9 an application of the system shown in FIGURE 8 is illustrated wherein magnetic recording and recall or pickup heads 60*a*, 60*b* and 60*c* are mounted in operative relationship with the successive drum units 70*a*, 70*b* and 70*c*. Cables 72*a*, 72*b* and 72*c* carrying groups of energizing conductors for the series of coils in the respective drum units are provided, which extend from the unit coil selector apparatus 74. The shaft 10 is rotated by a constant-speed motor 76 and the system is provided with an impulse generator or timer 78 which provides a timing impulse or wave to the data source 80 through the connection 82 so that the recorded data carried by each drum unit will be referenced to a particular point or position on its periphery. Switches 84*a*, 84*b* and 84*c*, controlled by a programming unit 85, channel the data source output signals into the recording pickup units 60*a*, 60*b* and 60*c* for either separate or simultaneous recording purposes. However, such switches are operable by the programmer to disconnect the data source 80 from the units 60*a*, 60*b* and 60*c* and to connect such latter units to the input channels 86*a*, 86*b* and 86*c* of a computer device 88, which may also be controlled by timer 78. Timing impulses previously recorded on the drums themselves may be used in lieu of the separate timer, if desired. Additional sets of inputs 86*a'*, 86*b'* and 86*c'* may also be provided for the computer so as to permit recording data on a plurality of different drum assemblies and later recalling the recorded data in order to operate the computer. The computed answer may in turn be fed through the channels 72*a*, 72*b* and 72*c* to one or more of the individual drum units for read-out or display purposes.

In case it is desired to hold a particular drum position or reading in a recorder unit, such as that shown in FIGURE 9, while disconnecting the energized coils within the drum units of the same so that the same energizing source may be used to produce readings or positionings on other drum units, without use of special holding circuits or the like, it will be evident that the ferromagnetic field elements such as the pole pieces or pole cores (52, 50) of the drum units may be formed of a high-retentivity ferromagnetic material. Thus the permanent magnetism established in the magnetic circuit of an energized coil holds the drum rotors stationary against the forces of rotation produced by rotation of the shaft 10. In order to erase or eradicate this permanent magnetism after the functions of the system have been completed, an eradicator circuit 90 may be provided in association with the unit coil selector 74, which produces an oscillating coil current which is decreased in intensity from a substantial value to substantially zero, according to the well known principles applicable to demagnetization. However, prior to such eradication the individual units may be scanned for read-out purposes, utilizing the state of magnetization of the respective unit field structures as a means to store or memorize data.

These and other aspects of the invention will be evident to those skilled in the art based on the foregoing disclosure of the preferred embodiments thereof.

I claim as my invention:

1. Rotary electromechanical data translation means comprising a driving member adapted to be rotated continuously, a rotary driven member journalled on said driving member to rotate thereon but subject to journal friction operable normally to rotate the driven member with the driving member, said driven member having thereon an annular, electrically conductive, non-magnetic vane portion extending therearound, and stationary electromagnet means operable to stop the rotary driven member in any of different selected positions comprising a plurality of separately energizable electromagnets positioned at intervals around the axis of said driving member and having pole faces disposed closely adjacent a first side of said vane portion, and an elongated ferromagnetic armature strip carried by the vane portion on the side thereof opposite said first side, said armature strip extending around a major fraction of the peripheral length of said vane portion, whereby magnetic flux emanating through one of said pole faces is attracted outwardly through said electrically conductive vane portion by said armature strip, inducing eddy-currents in the latter to retard the driven member, and whereby the driven member is then stopped with one of its armature strip ends magnetically held by such flux emanation.

2. The combination defined in claim 1, wherein the armature strip has one end tapered relatively gradually to a tip and its opposite end terminated relatively abruptly, and is of approximately uniform cross-section between such ends, said armature strip being rotationally oriented with its gradually tapered end pointed in the direction of driving member rotation.

3. The combination defined in claim 2, wherein the driving member comprises a shaft and the rotary driven member is of cup-like form comprising a central hub portion journalled on the shaft, a web portion extending outwardly therefrom, and an outer flange, comprising said vane portion, extending transversely to the web portion and generally parallel to the shaft, the electromagnet means being of ring-like form surrounded by said outer flange, with the electromagnet pole faces stationed closely adjacent the interior face of said flange.

4. The combination defined in claim 3, wherein the flange carries data indication markings thereon and carries a magnetic recording strip extending continuously therearound.

5. The combination defined in claim 1, wherein the electromagnets include ferromagnetic elements of sufficiently high retentivity to maintain flux operable to hold the rotary driven member against rotation by the driving member upon deenergization of the electromagnet producing such flux.

6. Rotary electromechanical data translation means comprising a driving member adapted to be rotated continuously, and a plurality of controllable units each including a rotary driven member rotationally yieldably interconnected with the driving member to permit relative rotation therebetween when the driven member is restrained, said driven member being normally rotated by the driving member through said interconnection, said driven member having thereon an annular, electrically conductive, nonmagnetic vane portion extending therearound, and stationary electromagnet means operable to stop the rotary driven member in any of different selected positions comprising a plurality of separately energizable electromagnets positioned at intervals around the axis of said driving member and having pole faces disposed closely adjacent a first side of said vane portion, and an elongated ferromagnetic armature strip carried by the vane portion on the side thereof opposite said first side, said armature strip extending around a major fraction of the peripheral length of said vane portion, whereby magnetic flux emanating through one of said pole faces is attracted outwardly through said electrically conductive vane portion by said armature strip, inducing eddy-currents in the vane to retard the driven member, and whereby the driven member is then stopped with one of its armature strip ends magnetically held by such flux emanation.

7. The combination defined in claim 6, wherein the rotational interconnection between each driven member and the driving member cooperating therewith includes a bar magnet element carried by one member and a ferromagnetic detent armature element carried by the cooperating other member, whereby the driven members during conjoint rotation thereof are maintained in predetermined phased relationship.

8. The combination defined in claim 7, wherein the driving member comprises a shaft and the rotary driven member is of cup-like form comprising a central hub portion journalled on the shaft, a web portion extending outwardly therefrom, and an outer flange, comprising said vane portion, extending transversely to the web portion and generally parallel to the shaft, the electromagnet means being of ring-like form surrounded by said outer flange, with the electromagnet pole faces stationed closely adjacent the interior face of said flange.

9. The combination defined in claim 8, wherein the cup-like rotary driven members comprise a second flange carrying an elongated ferromagnetic strip comprising the detent armature element, and wherein the bar magnets are carried by the shaft within the respective second flanges.

10. The combination defined in claim 9, wherein the second flanges are encircled by the respective electromagnet means and wherein both armature strips of each driven member each has one end tapered relatively gradually to a tip and its opposite end terminated relatively abruptly, and is of approximately uniform cross-section between such ends, the two strips subtending substantially the same angle originating at the rotation axis, and the electromagnets also having pole faces disposed adjacent the second flange of each driven member whereby additional holding force is applied by flux emanating from the latter pole faces into the detent armature strips.

11. The combination defined in claim 6, wherein the rotational interconnection between each driven member and the driving member cooperating therewith comprises mutually cooperating detent elements carried by the respective members, whereby the driven members during conjoint rotation thereof are maintained in predetermined phase relationship, and wherein the rotary driven member carries indication markings thereon and carries a magnetic recording strip extending continuously therearound.

12. Rotary electromechanical data translation means comprising a driving member adapted to be rotated continuously, and a plurality of controllable units each including a rotary driven member rotationally yieldably interconnected with the driving member to permit relative rotation therebetween when the driven member is restrained, said driven member being normally rotated by the driving member through said interconnection, said driven member having thereon an annular, electrically conductive, nonmagnetic vane portion extending therearound, and stationary electromagnet means operable to stop the rotary driven member in any of different selected positions comprising a plurality of separately energizable electromagnets positioned at intervals around the axis of said driving member and having pole faces disposed closely adjacent a first side of said vane portion, and ferromagnetic strip means substantially surrounding said vane portion in immediate proximity thereto at the side thereof opposite said first side, said ferromagnetic strip means having a discontinuity therein carried by said vane portion, whereby magnetic flux emanating through one of said pole faces is attracted outwardly through said vane portion by said ferromagnetic strip, inducing eddy-currents in the vane to retard the driven member, and whereby the driven member is then stopped with said discontinuity magnetically held by such flux emanation.

References Cited in the file of this patent

UNITED STATES PATENTS 2,840,807 Todd et al. ------------- June 24, 1958